United States Patent
Essinger et al.

(10) Patent No.: US 8,857,544 B2
(45) Date of Patent: Oct. 14, 2014

(54) SYSTEM FOR ELECTRIC MOTORIZATION OF A WHEEL

(75) Inventors: Olivier Essinger, La Tour de Peilz (CH); Cesare Stacchi, Hirusio (CH)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 189 days.

(21) Appl. No.: 13/395,815

(22) PCT Filed: Dec. 17, 2010

(86) PCT No.: PCT/FR2010/052785
§ 371 (c)(1),
(2), (4) Date: May 15, 2012

(87) PCT Pub. No.: WO2011/073590
PCT Pub. Date: Jun. 23, 2011

(65) Prior Publication Data
US 2012/0228921 A1    Sep. 13, 2012

(30) Foreign Application Priority Data

Dec. 17, 2009  (FR) ..................................... 09 59145

(51) Int. Cl.
*B60K 1/00* (2006.01)
*B64C 25/40* (2006.01)
(52) U.S. Cl.
CPC ............. *B64C 25/405* (2013.01); *Y02T 50/823* (2013.01)

USPC .......................................... 180/65.51; 244/50
(58) Field of Classification Search
USPC ...... 180/65.51, 904, 65.1; 244/103 R, 100 R, 244/55, 12 R, 103 S; 301/6.1, 6.2, 6.5
See application file for complete search history.

(56) References Cited

U.S. PATENT DOCUMENTS

| | | | |
|---|---|---|---|
| 2,320,547 A | 6/1943 | Tiger | |
| 3,762,670 A | 10/1973 | Chillson | 244/50 |
| 3,764,094 A | 10/1973 | Cross | 244/50 |
| 3,850,389 A | 11/1974 | Dixon | 244/103 S |
| 3,874,619 A * | 4/1975 | Collins et al. | 244/50 |
| 3,977,631 A | 8/1976 | Jenny | 245/50 |
| 7,445,178 B2 * | 11/2008 | McCoskey et al. | 244/50 |
| 8,220,740 B2 * | 7/2012 | Cox et al. | 244/103 R |
| 2007/0158497 A1 | 7/2007 | Edelson et al. | 244/103 S |

(Continued)

FOREIGN PATENT DOCUMENTS

DE  10 2008 006 295 A1  1/2008
GB      2 210 833 A     6/1989

(Continued)

*Primary Examiner* — John Walters
*Assistant Examiner* — James Triggs
(74) *Attorney, Agent, or Firm* — Fitzpatrick, Cella, Harper & Scinto

(57) ABSTRACT

The invention relates to a system for motorizing a wheel (2), the system comprising a motor unit (4), a drive member (6) secured to the wheel (2) and a clutch device (7) connects the output shaft (8) of the motor unit (4) to the drive member (6). According to the invention, the motor unit (4) comprises an electric motor (11) and is carried by an un-sprung part of a suspension strut (3) of an aircraft so that the latter can be made to move along the ground.

27 Claims, 14 Drawing Sheets

(56) References Cited

U.S. PATENT DOCUMENTS

| | | | |
|---|---|---|---|
| 2009/0218440 A1 | 9/2009 | Dilmaghani et al. | 244/50 |
| 2009/0294577 A1 | 12/2009 | Roques et al. | 244/50 |
| 2012/0153075 A1 | 6/2012 | Wilson et al. | 244/50 |
| 2013/0200210 A1 | 8/2013 | Oswald et al. | 244/50 |

FOREIGN PATENT DOCUMENTS

| | | |
|---|---|---|
| GB | 2 323 345 A | 9/1998 |
| WO | WO 2008/001013 A1 | 1/2008 |
| WO | WO 2010/063895 A1 | 6/2010 |

\* cited by examiner

SYSTEM FOR ELECTRIC MOTORIZATION OF A WHEEL

The present invention relates to a system for motorizing a wheel of an aircraft, for example as applied to an aeroplane, for making the latter move along the ground.

The concept of motorizing the movement of aircraft on the ground means motorizing the aircraft so that they can move around autonomously but at low speeds, like an aeroplane does before it takes off or after it has landed at airports; this is what is commonly known as "taxiing". It does not therefore here mean motorizing the wheel in order to bring it up to a speed consistent with the landing speed as has already been proposed in the prior art.

A known motorizing system for powering a wheel associated with a suspension, is of the type comprising a motor unit, a drive member secured to the wheel, and a clutch device connecting the output shaft of the motor unit to the drive member.

However, such systems are often somewhat incompatible with the deformations experienced by the suspension and by the wheel rim, which deformations occur during the various manoeuvres on the ground, such as turning or braking.

The present invention sets out to produce a motorizing system that is easily able to withstand the deformations of the suspension strut and of the wheel itself.

According to the invention, in the motorizing system of the aforementioned type, the motor unit comprises an electric motor and is carried by an un-sprung part of a suspension strut.

Thus, the entire motorizing system is carried by the un-sprung part of the suspension strut: on the one hand, the drive member is carried by the wheel and, on the other hand, the motor unit and the clutch device are carried by the axle crossmember, making the motorizing system easier to integrate. Furthermore, because of this arrangement, there is no longer any need to take account of the movement of the suspension shock absorber when bringing the output shaft of the motor unit into connection with the drive member.

According to a first alternative form, the motor unit is carried by an axle crossmember of the wheel.

According to a second alternative form, the motor unit comprises a reduction system connecting the output shaft of the motor to the drive member.

According to a third alternative form, the reduction system is secured to the motor.

According to a fourth alternative form, the clutch device is configured in such a way as to be able to move the motor unit into an engaged position in which this unit is connected to the drive member, and a disengaged position in which this unit is separated therefrom.

According to a fifth alternative form, the clutch device is configured in such a way that the motor unit is mounted to pivot with respect to the axle crossmember about a horizontal pivot axis.

According to a sixth alternative form, the clutch device comprises a movement system allowing the motor unit to be moved from one of its two, engaged and disengaged, positions into the other.

According to a seventh alternative, the movement system is designed to apply to the motor unit a force higher than a limit value necessary for the motor unit to remain in the engaged position.

According to an eighth alternative form, the movement system comprises a driving element.

According to a ninth alternative form, the driving element is formed of an actuating jack.

According to a tenth alternative form, one end of the actuating jack is mounted for rotation on a fixing piece secured to the crossmember, the other end of the actuating jack being mounted for rotation on two links, one of these links being mounted for rotation on the fixing piece, the other link being mounted for rotation on the motor unit.

According to an eleventh alternative form, the motor unit is arranged in such a way as to be naturally driven into the disengaged position under its own weight.

According to a twelfth alternative embodiment, the clutch device comprises a guided link defining the disengaged position of the motor unit.

According to a thirteen alternative form, the guided link comprises a rod, the said rod being, on the one hand, mounted for rotation on a fixing piece secured to the crossmember and, on the other hand, mounted for sliding with respect to a pivot carried by the motor unit.

According to a fourteenth alternative form, a shock-absorbing unit, able to absorb the shocks of the motor unit, is arranged between the pivot and the free end of the rod.

According to a fifteenth alternative form, the shock-absorbing unit is formed of a fixed end stop, fixed to the free end of the rod, a moving end stop mounted to slide along the rod between the free end thereof and the pivot, and an elastic member arranged between the two end stops in such a way that the elastic member is preloaded between the two end stops when the motor unit is not in the disengaged position.

According to a sixteenth alternative form, the drive member is an ring gear carried by the rim of the wheel and designed to enter into mesh with the output gear of the motor unit when the latter is in its engaged position.

According to a seventeenth alternative form, the in-mesh position of the output gear is defined by two rolling lips carried by the ring gear and designed to have two runway tracks carried by the gear rolling along them without sliding.

The invention also relates to an assembly of two motorizing systems according to the first aspect of the invention, the two motor units being secured to one another and fixed to the un-sprung part of the suspension strut common to the two wheels.

According to a first alternative form, the two motor units are arranged between the two wheels.

According to a second alternative form, the two motor units are arranged behind a suspension strut carrying the axle crossmember.

According to a third alternative form, the assembly of two motorizing systems comprises only one clutch device common to both systems.

Such a motorizing system or such an assembly of two motorizing systems, as the case may be, is advantageously used to motorize a main landing gear of an aircraft.

Other specifics and advantages of the present invention will become apparent from the two embodiments given by way of nonlimiting examples and illustrated by the attached drawings in which.

Figure 1:
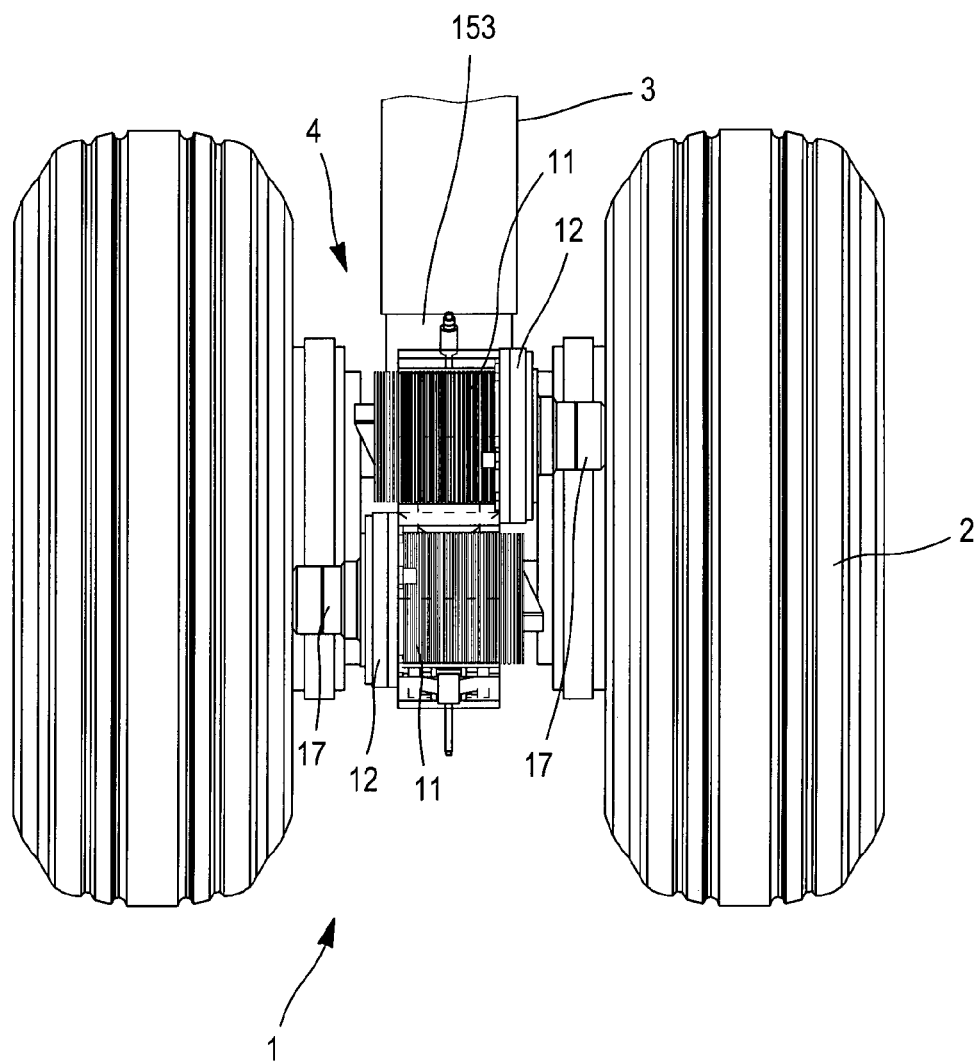
FIG. 1 is a rear perspective view of an aeroplane landing gear equipped with an assembly of two wheel motorizing systems according to a first embodiment of the present invention, the assembly being engaged with the wheels.
Figure 8:
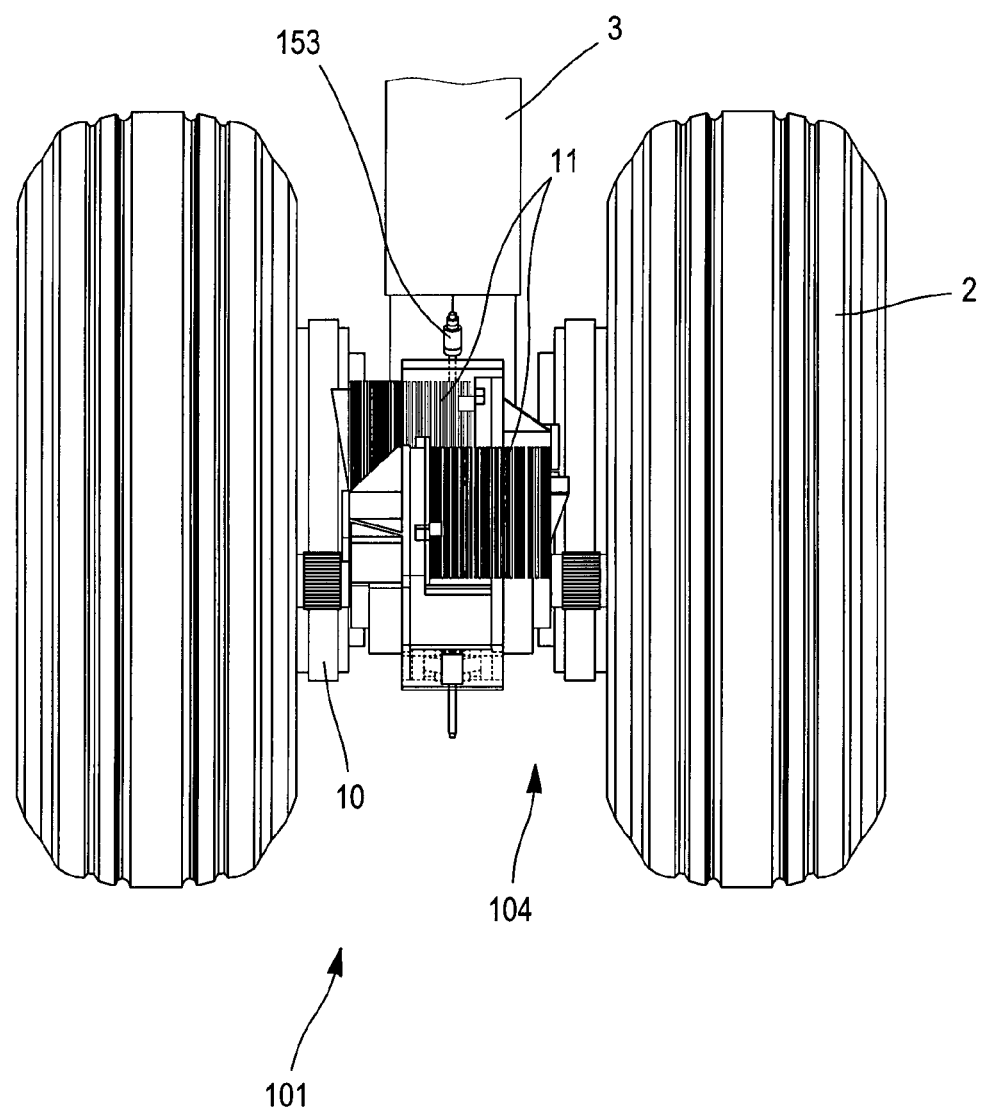
FIG. 8 is a view similar to FIG. 1, illustrating a second embodiment of the present invention.
Figure 14:
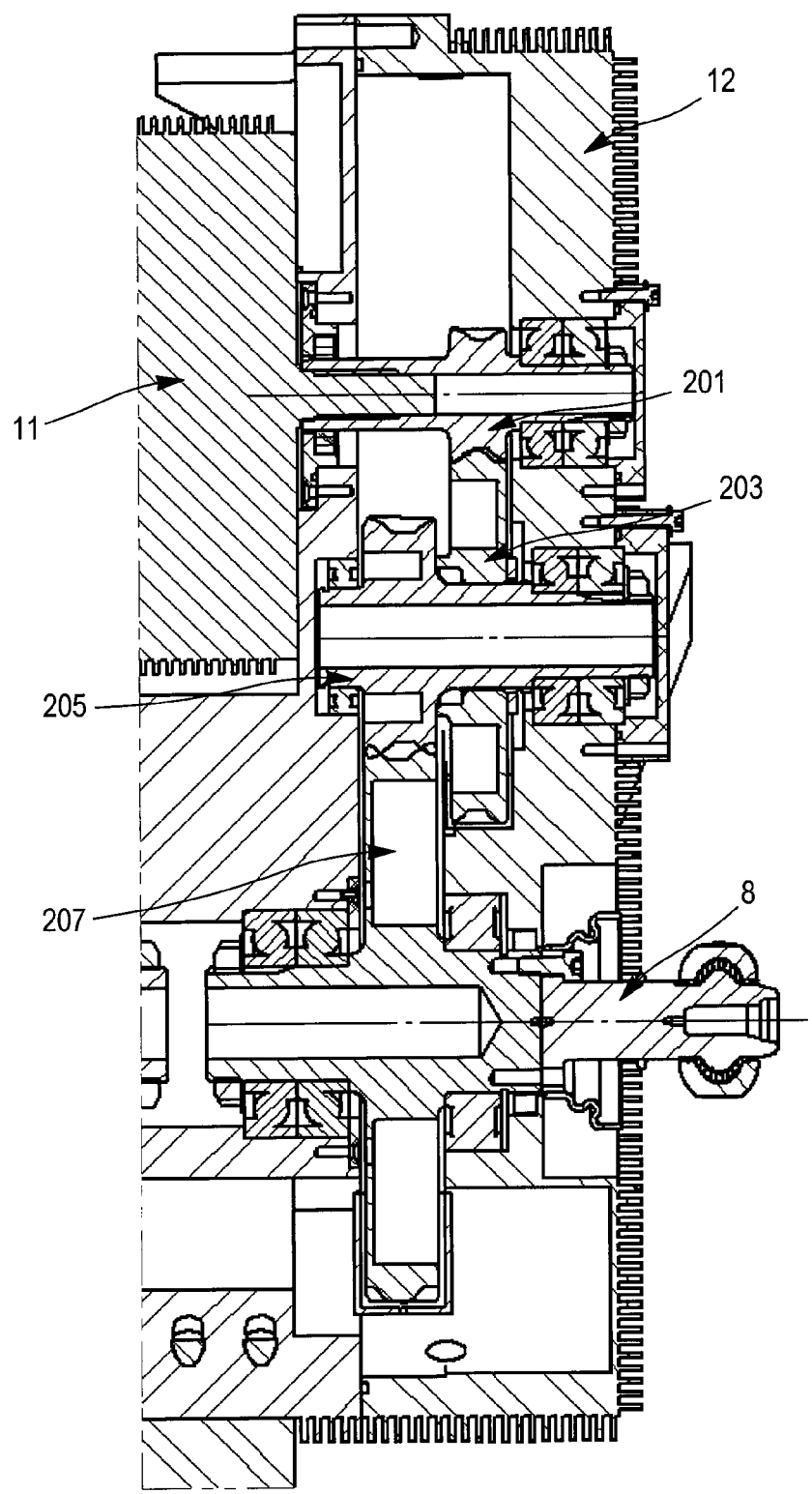

FIG. 14 is a view in section on a plane containing the axes of the gears in the reduction gearbox unit of this second embodiment; and FIGS. 1 and 8 depict a main landing gear 1, 101 of an aeroplane, comprising two coaxial wheels 2, and a suspension strut 3 carrying these two wheels 2. This landing gear 1, 101 also comprises an assembly of two wheel motorizing systems, namely one system per wheel 2. Having one motorizing system for each wheel 2 eliminates the need to add a differential and allows the speed of the wheels 2 to be adapted in turns. It also allows the loads on the suspension and on the wheel motorizing system to be equalized in part. In addition, it distributes the loads across all the tyres and that then evens out and limits tyre wear.

A motorizing system according to the present invention comprises a motor unit 4, 104 which is secured to the axle crossmember 5 of the wheel 2, a drive member 6 which is secured to the wheel 2, and a clutch device 7 which allows the output shaft 8 of the motor unit 4, 104 to be connected to the drive member 6. More specifically, the motor unit 4, 104 and the clutch device 7 are arranged on the outside of the crossmember 5 and are connected to one another while at the same time being cantilevered out from this crossmember.

Thus, the entire motorizing system is carried by the unsprung part 3a of the suspension strut 3: the motor unit 4, 104 and the clutch device 7 are carried by the axle crossmember 5, and the drive member 6 is carried by the wheel 2.

In these embodiments, the drive member 6 secured to the wheel 2 is formed of an ring gear 6 carried by the rim 9 of this wheel 2, this gear 6 entering into mesh with the output gear 10 of the motor unit 4, 104 when the latter is in its engaged position. This type of transmission via gears and toothed wheels is qualified as a "positive" transmission as opposed to frictions transmission systems such as systems involving friction rollers. A positive transmission is not dependent on the coefficient of friction and is therefore for example insensitive to the weather conditions or to the state of wear of the elements employed. Toothed belts systems are therefore also classified as positive transmissions, whereas plain (flat or Vee) belt systems are classified as friction transmission systems.

Moreover, in the present embodiments, the motor unit 4, 104 comprises a motor 11 (more specifically an electric motor which, in this instance, is a brushless synchronous motor) and a reduction gear system 12, 112 which connects the output shaft 13 of the motor 11 to the drive member 6. Here, the reduction system 12, 112 is secured to the motor 11. The electric motor 11, thus arranged, can easily be cooled by the ambient air (this cooling being dependent on the speed at which the aircraft is moving).

Figure 7:
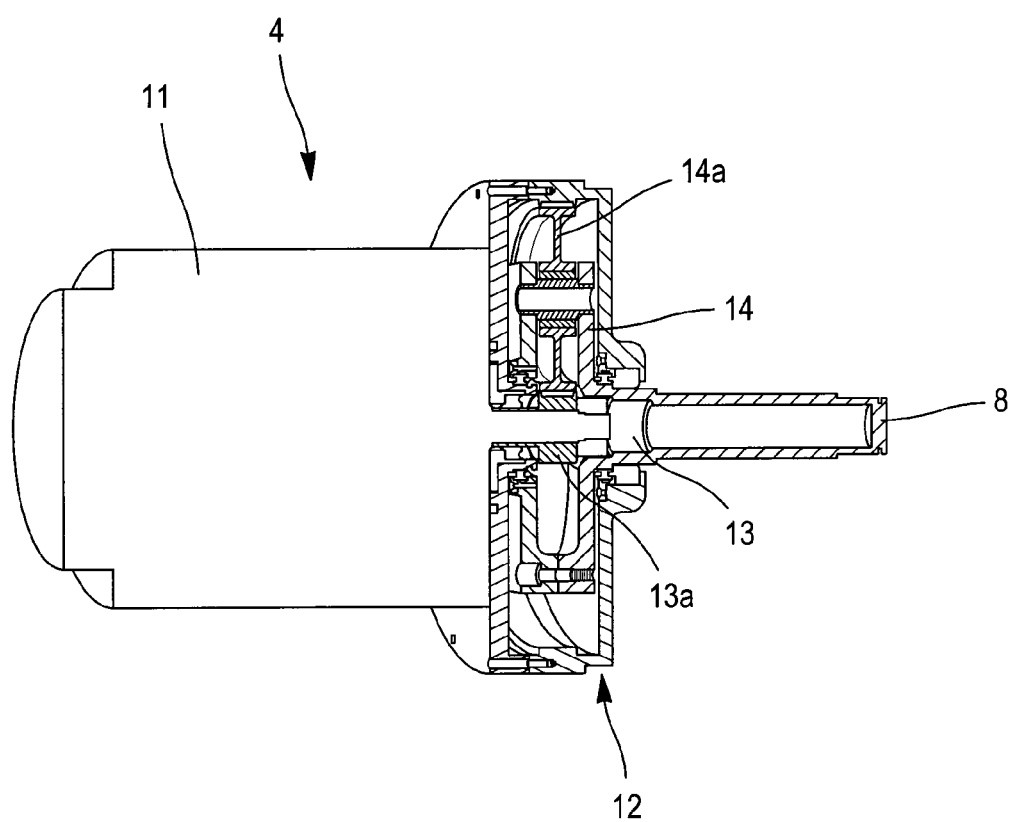
FIG. 7 is a view in axial section of a motor unit, without the output gear thereof.

As illustrated in FIG. 7, the reduction system 12 of the first embodiment comprises a stage which, in this instance, is formed of an epicyclic gear train. Furthermore, the motorizing system comprises a second reduction stage formed by the output gear 10 of the motor unit 4 (more specifically, the output gear 10 of the reduction system 12) and the ring gear 6 carried by the wheel 2.

More specifically, the reduction system 12 of the first embodiment is formed by the meshing of a sun gear 13a carried by the output shaft 13 of the motor 11 and of planet gears 14a carried by a planet carrier 14. The reduction ratio is preferably greater than 5 (in this instance it is 7.5). The second stage (outside the motor unit) is formed by the meshing of the output gear 10 of the motor unit 4 carried by the planet carrier 14 and of the ring gear 6 carried by the wheel 2 (the reduction ratio here is 6.8). Thus, in this instance, the total reduction ratio is 51. Here, the reduction system 12 is aligned with the motor 11 which means that the output shaft 13 of the motor 11 is coaxial with the output shaft 8 of the reduction system 12 (which is also the output shaft 8 of the motor unit 4).

In the assembly of two motorizing systems illustrated in FIGS. 1 to 3, 8 and 9, the two motor units 4, 104 are secured to one another. For reasons of compactness, the two motor units 4, 104 are arranged between the two wheels 2. Further, to limit the risk in the event of a collision with external objects (or birds), particularly at the moment of take-off or landing, the two motor units 4, 104 are positioned behind the suspension strut 3. Here, the two motor units 4, 104 are arranged contiguous with each other.

In the first embodiment, the output shafts 10 of the motor units 4 are parallel.

Figure 6A:
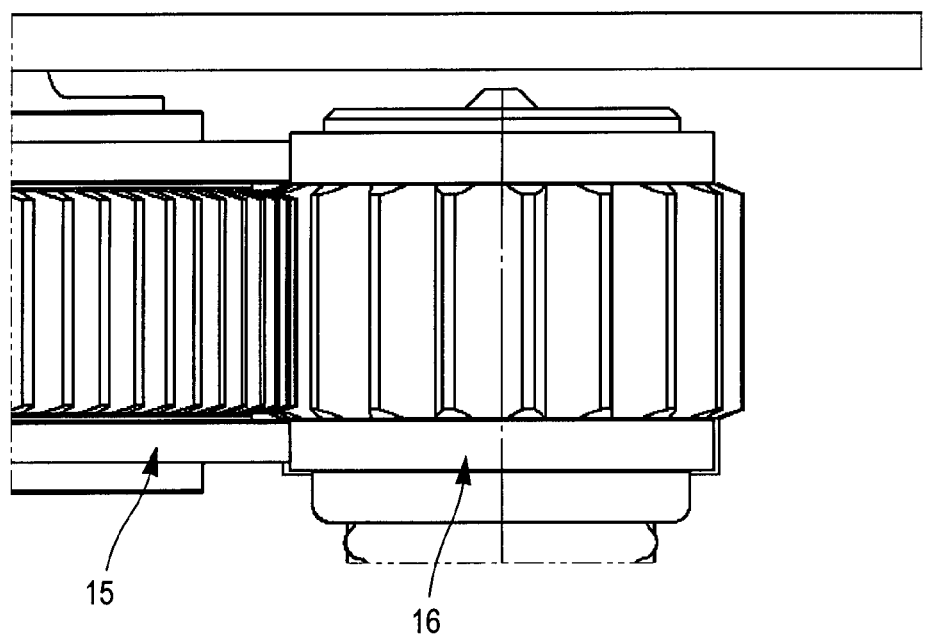
FIG. 6A is a view illustrating the collaboration between a wheel and the output shaft of the corresponding motor unit.
Figure 6B:
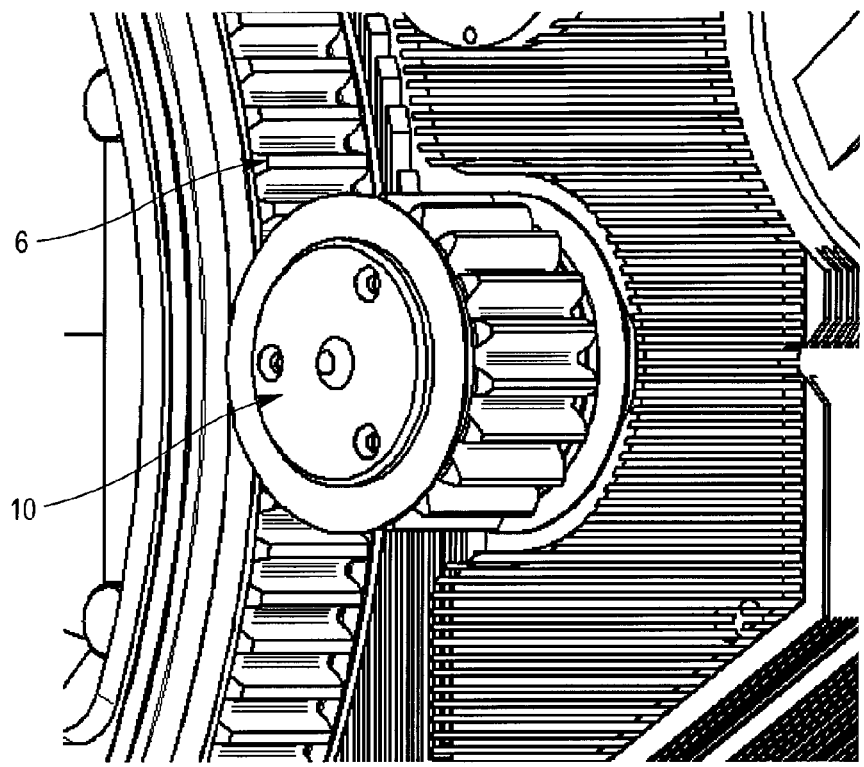
FIG. 6B is a perspective view of the mechanism of FIG. 6A.

In order to define the position of meshing of the motor unit 4, 104 (or more specifically that of the gear 10), see FIG. 6A, the ring gear 6 carries two cylindrical rolling lips 15 which are designed to have, rolling along them without sliding, two runway tracks 16 carried by the output gear 10 of the motor unit 4, 104. The rolling diameters of the rolling lips 15 and runway tracks 16 correspond to the pitch circle diameters of the gears 6, 10.

Figure 6C:
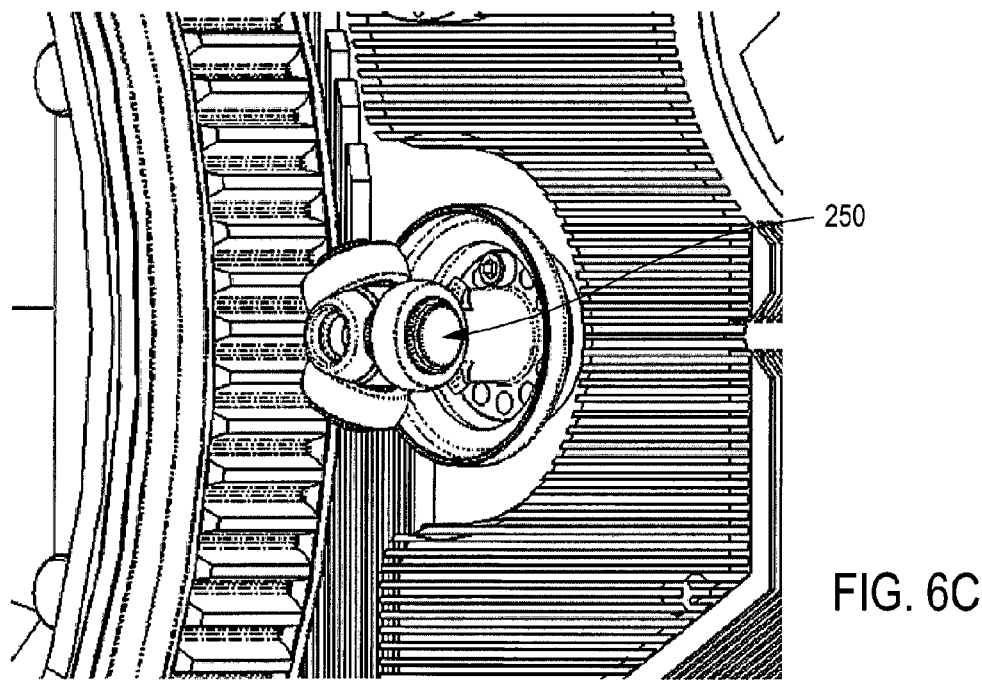
FIG. 6C is a perspective view similar to FIG. 6B but in which the gear has been omitted in order to show the internal constant-velocity joint.

Finally, in order to compensate for an angular variation between the output shaft 8 of the motor unit 4 and the ring gear 6 of the wheel 2 which might be caused by deformation of the landing gear under load, the gear 10 is carried by the output shaft 8 of the motor unit 4 via a constant-velocity joint 250, FIG. 6C, which accepts an angular deformation while at the same time transmitting the driving torque without any variation in speed. This constant-velocity joint may, for example, be a sliding tripot joint or a plunging ball joint in order also to allow axial movement. This use of a constant-velocity joint is not commonplace. Indeed, the conventional use of a constant-velocity joint is the same as that of a cardan joint, i.e. that it operates under pure torsion, radially and axial loads being reacted by the bearings that support the shafts. However, in the present use, the constant-velocity joint is used to transmit radial load (the bearing force of the clutch device) and tangential load (motive power). The joint is therefore able to absorb any misalignment between the reduction gear and the wheel.

In addition, the use of the runway tracks that define the meshing centre distance and the position of the constant-velocity joint supplement the device and allow the production of a meshing transmission that operates under great deformation of the wheel with respect to the reduction gearing, for example an angular deformation of several degrees (for example of the order of +/−5°).

Figure 2:
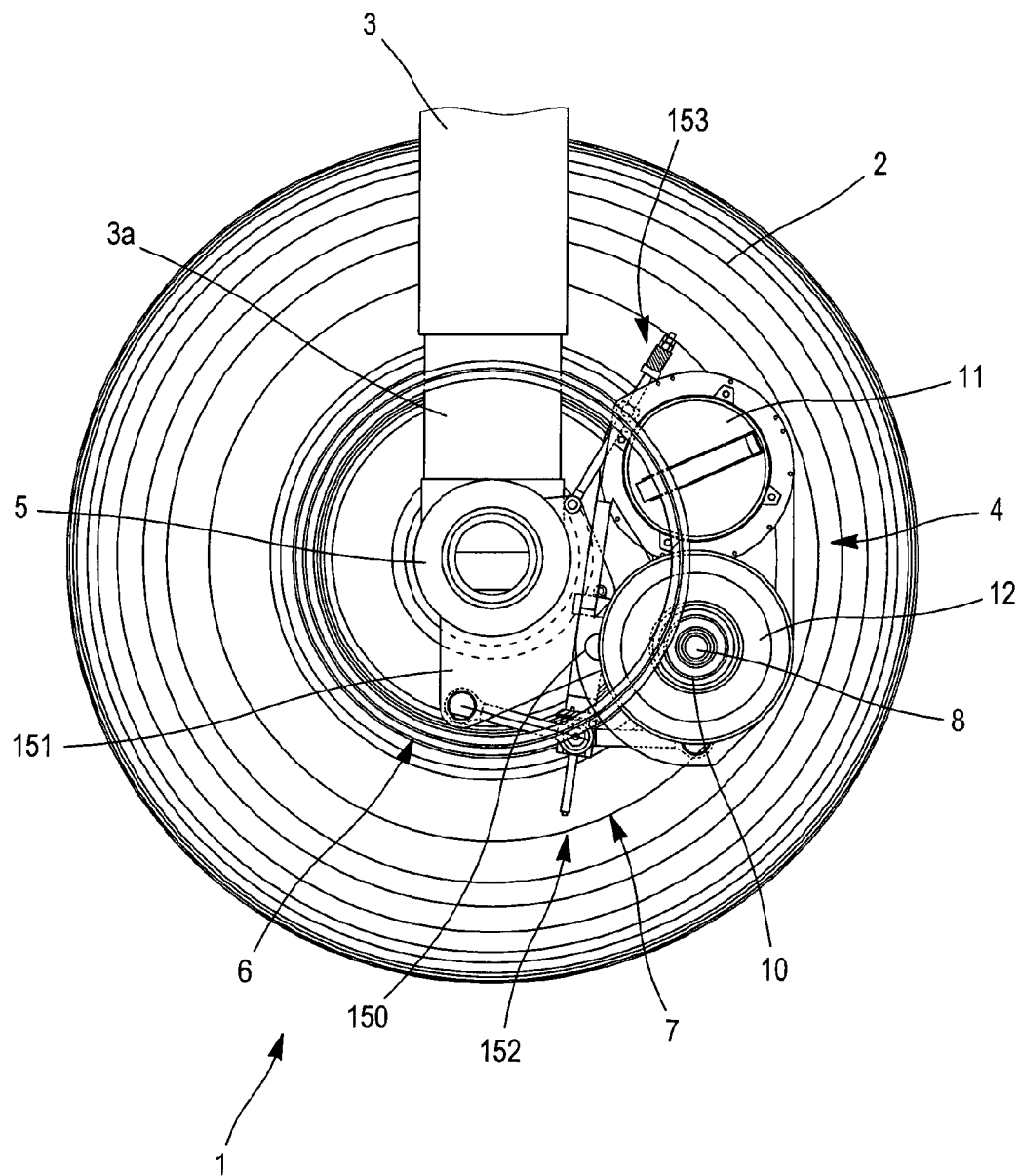
FIG. 2 is a view in section on a plane perpendicular to the axis of the wheels of the landing gear of FIG. 1, the assembly of the two systems being in the engaged position.
Figure 3:
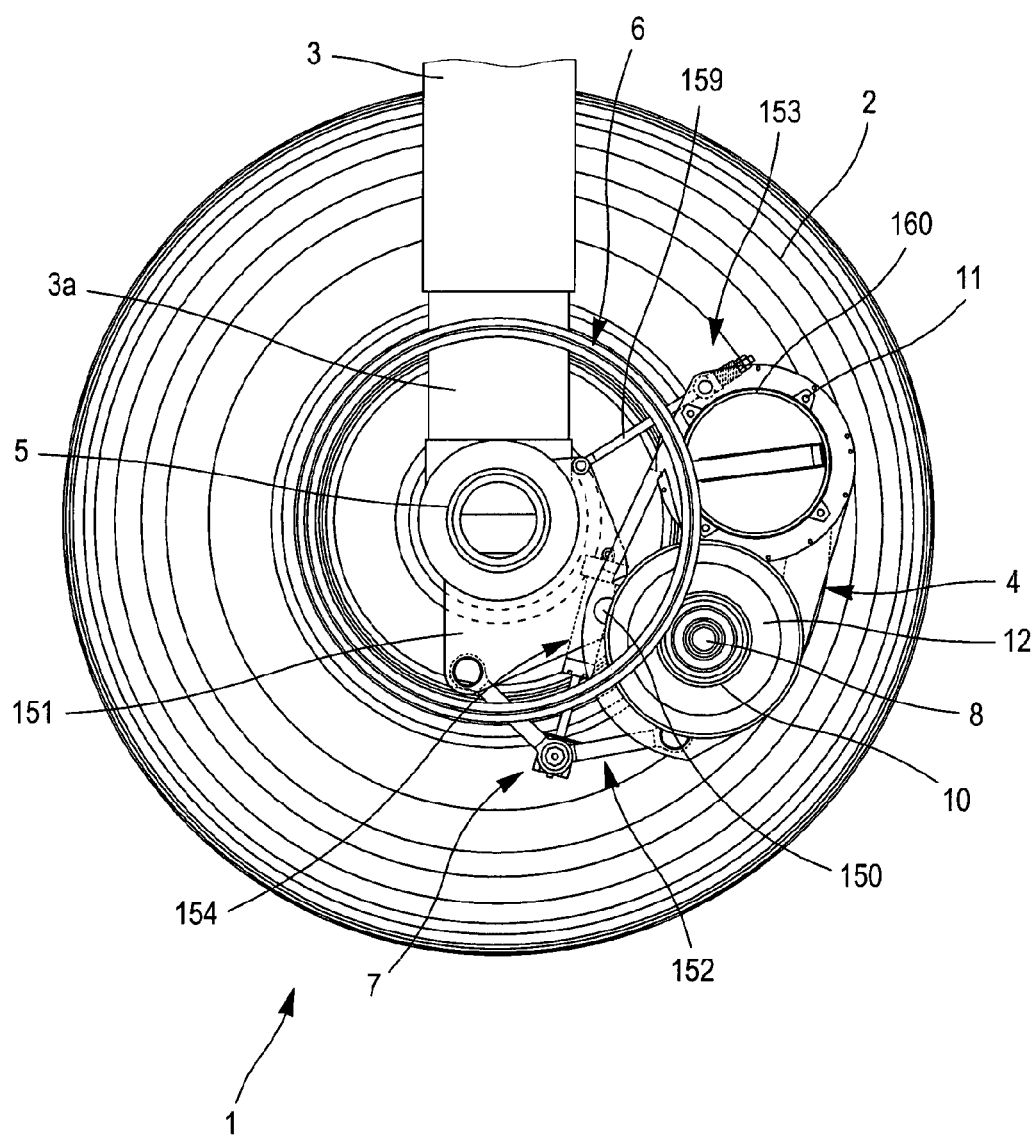
FIG. 3 is a view similar to FIG. 2, the assembly of the two motorizing systems being in the disengaged position.
Figure 9:
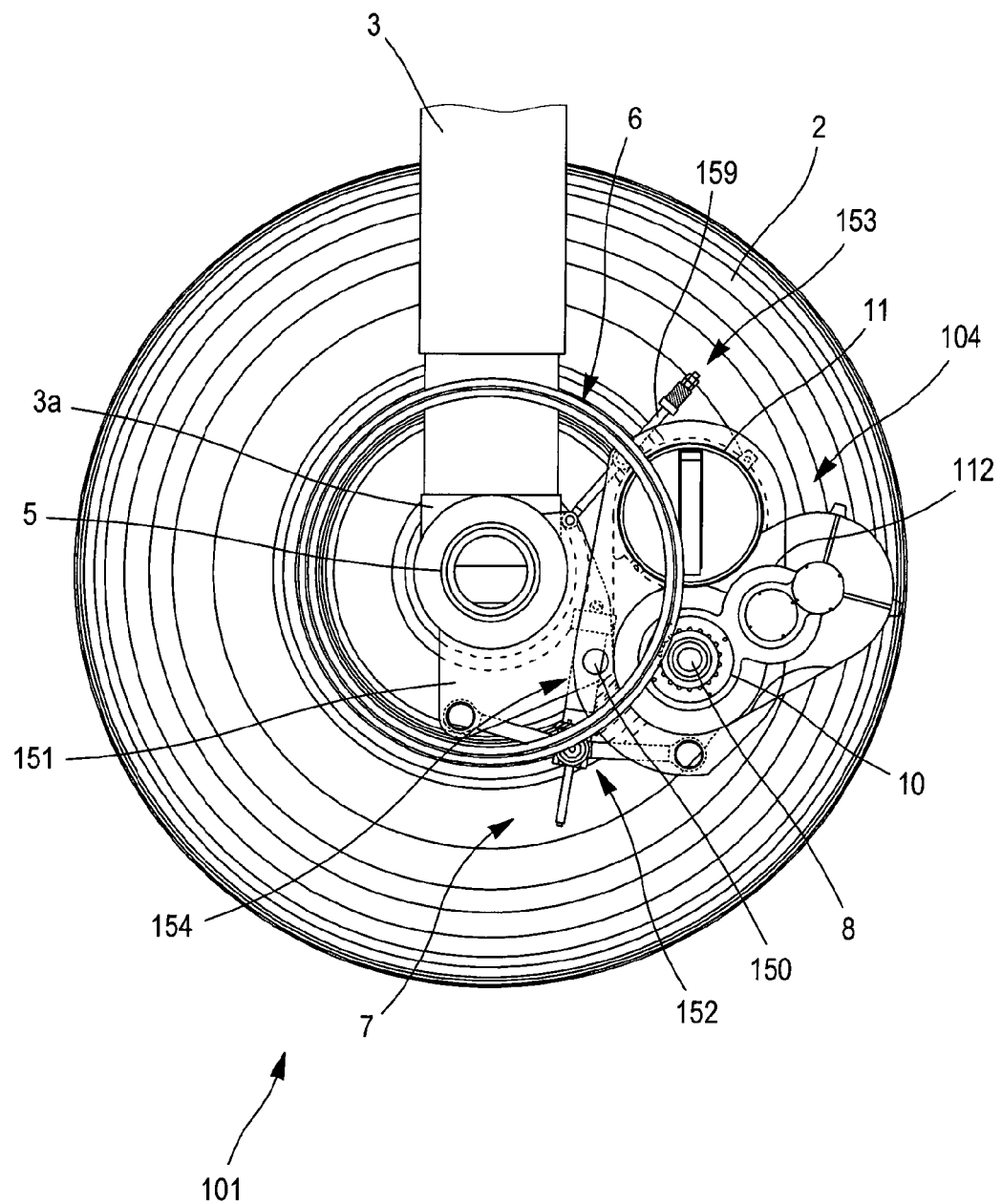
FIG. 9 is a view similar to FIG. 2 of the assembly of two motorizing systems according to the second embodiment.

Moreover, the clutch device 7 of a motorizing system is configured in such a way as to be able to move the motor unit 4, 104 between an engaged position in which the unit 4, 104 is connected to the drive member 6 (output gear 10 of the reduction system 12, 112 in mesh with the ring gear 6 of the wheel 2, as illustrated in FIGS. 2 and 9), and a disengaged position in which the unit 4, 104 is separated from the drive member 6 (gear 10 out of mesh with the ring gear 6, as illustrated in FIG. 3). In the present embodiments, in order to cause the two motor units 4, 104 to come into mesh almost simultaneously with the two wheels 2 and because the two motor units 4, 104 are joined together, the assembly of two motorizing systems comprises just one clutch device 7.

In the present embodiments, the clutch device 7 is configured in such a way that the motor unit 4, 104 is mounted to rotate (with respect to the axle crossmember 5) about a horizontal pivot axis. More specifically, the motor unit 4, 104 is connected in a pivoting manner to the un-sprung part 3a of the suspension strut 3 by a pivot 150 (the pivoting connection of the motor unit 4, 104 is performed on a fixing piece 151 carried by the axle crossmember 5). Thus, clutch engagement corresponds to a movement of the motor unit 4, 104 forward and upward and clutch disengagement to a movement backwards and downwards.

Associated with the clutch device 7 is an electronically controlled speed matching system. This system comprises a sensor for measuring the speed of the wheel 2 and commanding the corresponding rotational speed of the motor 11.

In the present embodiments, as illustrated in FIGS. 2 to 5 and 9, the clutch device 7 comprises a movement system 152 allowing the motor unit 4, 104 to be moved from one of its two, engaged and disengaged, positions into the other, and a guided link 154 defining the disengaged position of the motor unit 4, 104.

Figure 4:
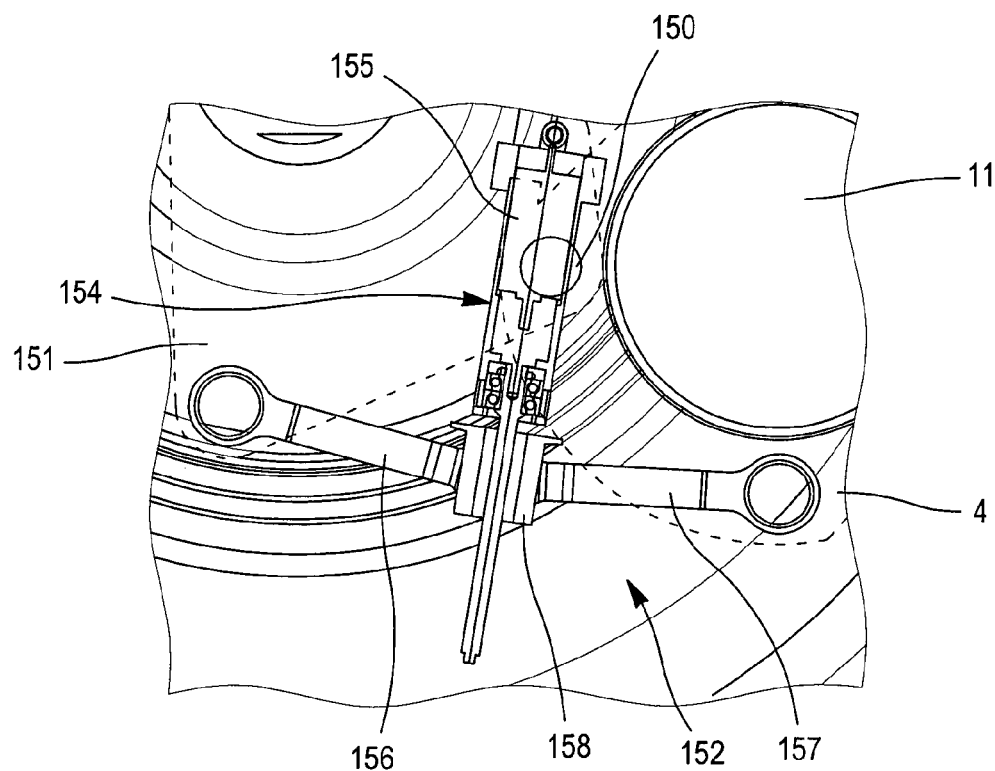
FIG. 4 is a view in cross section of the movement system of the clutch device of the assembly of the two motorizing systems.

As illustrated in FIG. 4, the movement system 152 comprises an actuating jack 154 connected to the motor unit 4, 104 and to the un-sprung part 3a of the suspension strut 3. More specifically, one end of the actuating jack 154 (here, the jack 155) is mounted for rotation about a horizontal pivot axis on the fixing piece 151. The other end is mounted for rotation on two links 156, 157 about two horizontal pivot axes, one of these links 156 also being mounted to rotate about a horizontal pivot axis on the fixing piece 151, the other link 157 itself being mounted for rotation about a horizontal pivot axis on the motor unit 4, 104. Here, the actuating jack 154 is an electrical actuating jack. More specifically, this actuating jack 154 comprises a driving motor which is arranged in the jack 155, a nut 158 to which the two links 156, 157 are connected, and a screw (for example a recirculating ball or roller screw).

The clutch device 7 (more specifically the movement system 152 with the associated toggle joint system 156, 157) allows sufficient force to be applied to the output gear 10, 110 of the motor unit 4, 104 to keep it in mesh with the ring gear 6. Because of the relative position of the motor units 4, 104, these units are naturally driven, under their own weight, into the disengaged position. As a result, when the actuating jack 154 is no longer applying any force (as soon as the electrical power supply to the drive motor is cut), the motor units 4, 104 move into their disengaged position.

Figure 5:
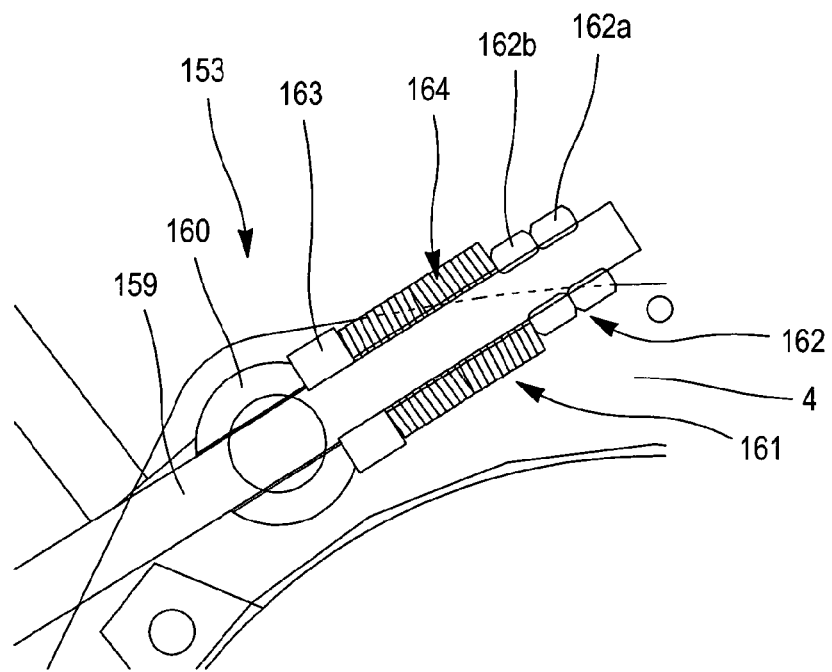
FIG. 5 is a view of the guided link of the clutch device of the assembly of two motorizing systems.

The guided link 153 itself defines the disengaged position of the motor unit 4, 104. As illustrated in FIG. 5, the guided link 153 comprises a rod 159 which is mounted to rotate (via a first end) on the fixing piece 151 about a fixed horizontal pivot axis. The rod 159 is mounted to slide through a pivot 160 which is carried by the motor units 4, 104. Arranged at the free end of the rod 159 is a shock-absorbing unit 161 able to absorb the shocks on the landing gear. Here, this shock-absorbing unit 161 is formed of a fixed end stop 162 (in this instance two nuts 162a, 162b) fixed at the free end of the rod 159, a moving end stop 163 (in this instance a washer 163) mounted to slide along the free end of the rod 159 and the elastic member 164 (here a stack of spring washers) arranged between the fixed end stop 162 and the moving end stop 163. Thus, when the motor unit 4, 104 moves from its engaged position into its disengaged position, the pivot 160 mounted to rotate freely with respect to the motor unit 4, 104, causes the rod 159 to rotate and slide. As the motor unit 4, 104 moves from the engaged position into the disengaged position, the moving end stop 163 bears against a shoulder of the end of the rod 159 (the moving end stop 163 cannot slide over the entire length of the rod 159), to guarantee a preload on the elastic member 164.

As a result, when the motor unit 4, 104 is in the disengaged position, the moving stop 163 is pressed against the pivot 160 and therefore compresses the elastic member 164. The elastic member is thus able to absorb the shock on landing.

To avoid clutch engagement during braking, landing, take-off or any other operation that might give rise to accelerations that would tend to return the motor unit to the engaged position, the movement system 152 may also comprise a return spring (not illustrated) urging the motor units 4, 104 into their disengaged position, and against the effect of which the actuating jack 154 acts when it drives the motor units 4, 104 into the engaged position.

The movement system 152 is designed to apply to the motor unit 4, 104 (to the gear 10) a force higher than a limit value necessary in order for the motor unit 4, 104 to remain in the engaged position (in order for the gear 10 and the ring gear to remain in mesh). This force may be constant or, on the other hand, set to a value tailored to the force necessary to allow the transmission of driving or braking torque.

Given the geometric configuration of the motorizing system, the meshing forces encourage unmeshing when the aeroplane is moving forwards and meshing when it is moving backwards. As a result, when moving forwards, the actuating jack 154 has to be powerful enough to maintain engagement. A backward shift in the position of the pivot 150 connecting the motor units 4, 104 to the fixing piece 151 would allow a system that was self-disengaging when moving backwards and when moving forwards.

A second embodiment of the motorizing system will now be described. In the figures, parts which are identical or similar in both embodiments bear the same references from one embodiment to the other.

Figure 10:
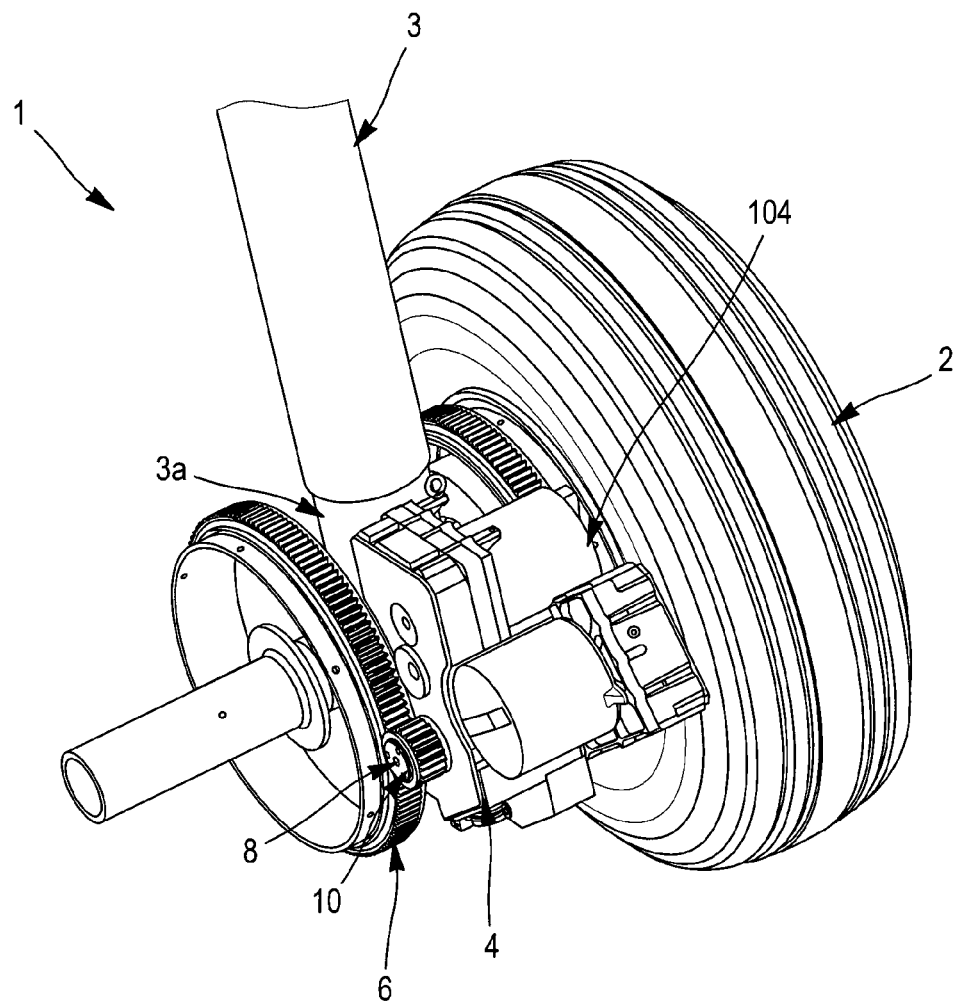
FIG. 10 is a perspective view of an aeroplane landing gear equipped with an assembly of two wheel motorizing systems according to a second embodiment of the present invention, the assembly being engaged with the wheels and the nearest wheel being depicted without its tyre or its rim.

FIG. 10 depicts an aeroplane main landing gear 1, one of the two wheels 2 of this landing gear being depicted without its tyre or its rim for the sake of clarity. Apart from the two wheels 2 which are coaxial, and the suspension strut 3 that carries these two wheels 2, the landing gear 1 also comprises an assembly of two wheel motorizing systems, namely one system per wheel.

A motorizing system according to a second embodiment of the invention comprises a motor/reduction gear unit 4, 104 which is carried by the un-sprung part 3a of the suspension strut 3. In a similar way to the first embodiment, it also comprises a drive member 6 which is secured to the wheel 2, and a clutch device 7 (not visible in FIG. 10) that allows the drive member 6 to be connected to a gear 10 secured to the output shaft 8 of the motor unit 4.

As before, the motor unit 4 comprises a motor 11 and a reduction system 12, 112 allowing the output shaft 13 of the motor 11 to be connected to the drive member 6. Here, the reduction system 12, 112 is secured to the motor 11. The motorizing assembly thus arranged can easily be cooled by ambient air flowing around the wheels of the aircraft.

As illustrated in FIG. 14, the reduction system 12, 112 comprises two stages arranged in series. Here, each stage is formed of a simple gear set. Further, the motorizing system comprises a third reduction stage formed by the output gear of the motor unit (more specifically the output gear 10 of the reduction system 12) and the ring gear 6 carried by the wheel 2.

More specifically, the first stage of the reduction system 12 is formed by the meshing of a first drive gear 201 carried by the output shaft of the motor 11 and of a first gear wheel 203 (the reduction ratio here is around 3). The second stage is formed by the meshing of a second gear 205 carried by the first gear wheel 203 and of a second gear wheel 207 (the reduction ratio here is around 2.5). The third stage (outside the motor unit) is formed by the meshing of the output gear 10 of the motor unit 4 carried by the output shaft 8 secured to the second gear wheel 207 and by the ring gear 6 carried by the wheel 2 (the reduction ratio here is around 7).

In the assembly of two motorizing systems which is illustrated in FIG. 10, the two motor units 4, 104 are secured to one another (here they are protected from the outside by the same casing). For reasons of compactness, the two motor units 4, 104 are arranged between the two wheels 2. Further, to reduce the risk of collision with external objects (or birds), especially during take-off and landing phases, the two motor units 3 are arranged preferably behind the suspension strut 3.

In addition, the two motor units are arranged in a V-shape with respect to one another so that the output shafts 8, and therefore the gears 10, are on the same axis, in a similar way to FIG. 8. That allows symmetric operation giving better meshing effectiveness.

In addition, this V-configuration allows the motor units 4, 104 not to touch the ground upon landing if a tyre bursts and protects the second motor from impacts (birds etc.). The bottommost point of the V corresponds to the common axis of the two output shafts 8 of the two reduction systems 12, 112, each upper end of the V corresponding to the axis of a motor 11. In addition, this V-shaped configuration of the reduction gears is advantageous for gear lubrication. During operation, the gears circulate the oil (which at rest lies in the reservoir situated in the point of the V) as far as the first stage, thus providing all the gearing with lubrication).

Figure 11:
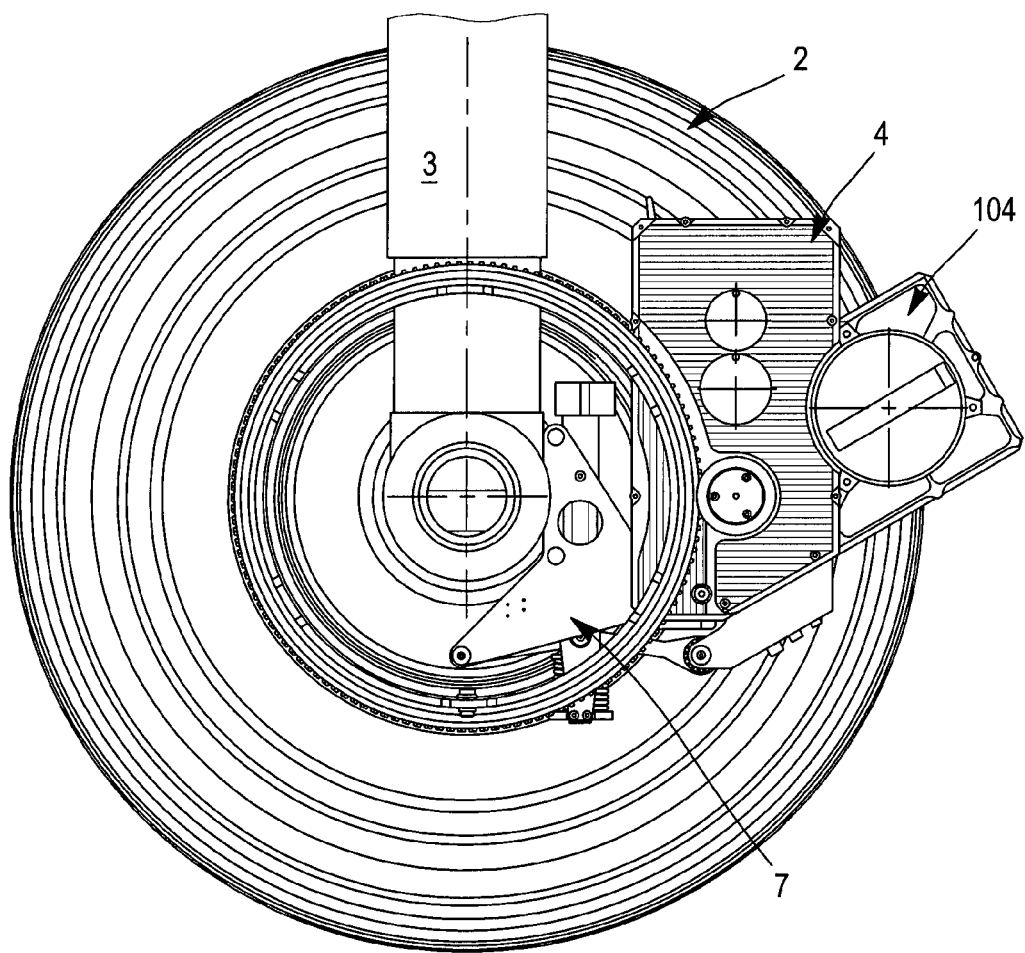
FIG. 11 is a view in section on a plane perpendicular to the axis of the wheels of the landing gear of FIG. 10, the assembly of the two systems being in the engaged position.

It should also be noted that the meshing between the gear and the gear wheel is substantially at the same height as the axis of the wheels in this embodiment of the invention, see FIG. 11, making it easier to accommodate the deformations of the crossmember or of the wheel. The expression "substantially at the same height as" is to be interpreted in this context as the meshing being positioned precisely at the same height as or in an angular sector ranging from 20° below the horizontal to 20° above the horizontal.

Figure 12:
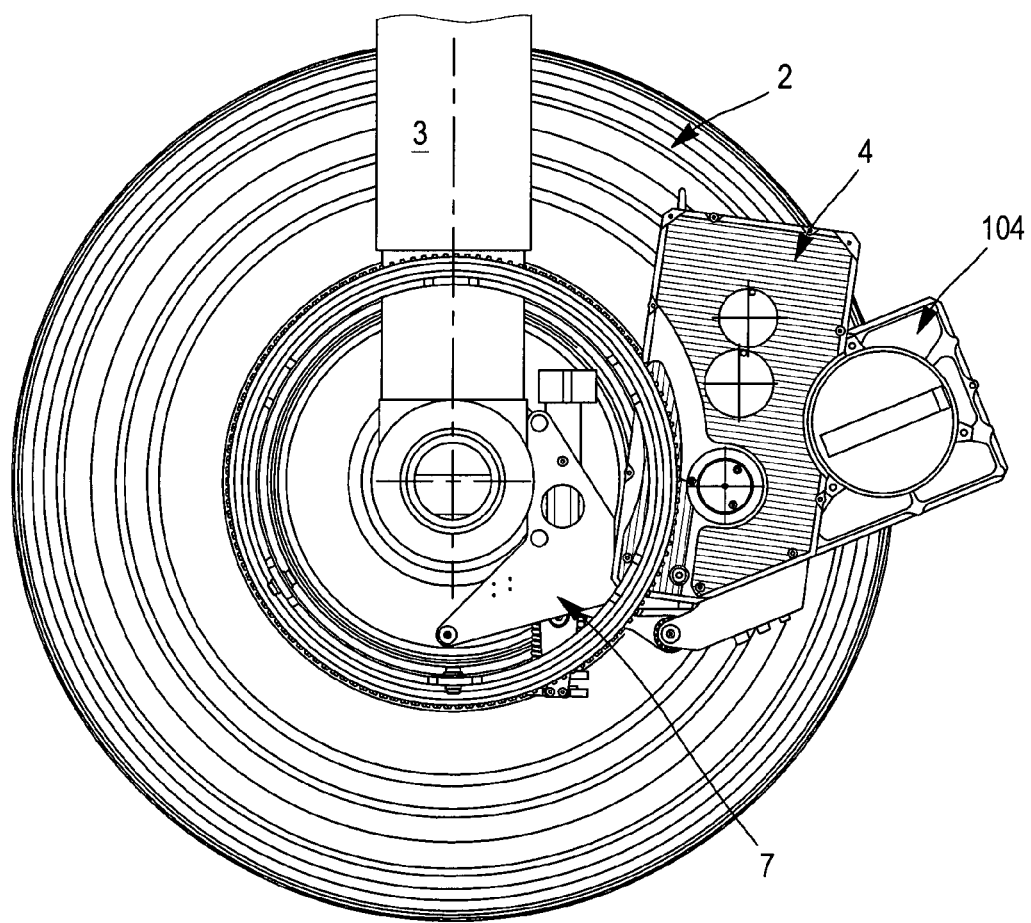
FIG. 12 is a view similar to FIG. 11, the assembly of the two systems being in the disengaged position.

Moreover, the clutch device 7 of a motorizing system is configured, FIGS. 11 and 12, in such a way as to be able to move the motor unit 4 between an engaged position in which this unit 4 is connected to the drive member 6 (output gear 10 in mesh with the ring gear 6 of the wheel 2 as illustrated in FIG. 11), and a disengaged position in which this unit 4 is separated therefrom (gear 10 disengaged from the ring gear 6, as illustrated in FIG. 12). As in the previous embodiment, in order to have simultaneous entry into mesh of the two motor units 4 with the two wheels 2 and because the two motor units 4 are joined together, the assembly of two motorizing systems comprises only one clutch device 7. However, the speeds of the gear 10 and of the ring gear 6 are synchronized separately for each wheel 2/motor unit 4 pairing.

The clutch device 7 is configured in such a way that the motor unit 4 is mounted for rotation (with respect to the un-sprung part of the suspension strut 3) about a horizontal pivot axis 226. Thus, clutch engagement corresponds to a movement of the motor unit 4 upwards and forwards, and clutch disengagement to a movement downwards and backwards.

Figure 13:
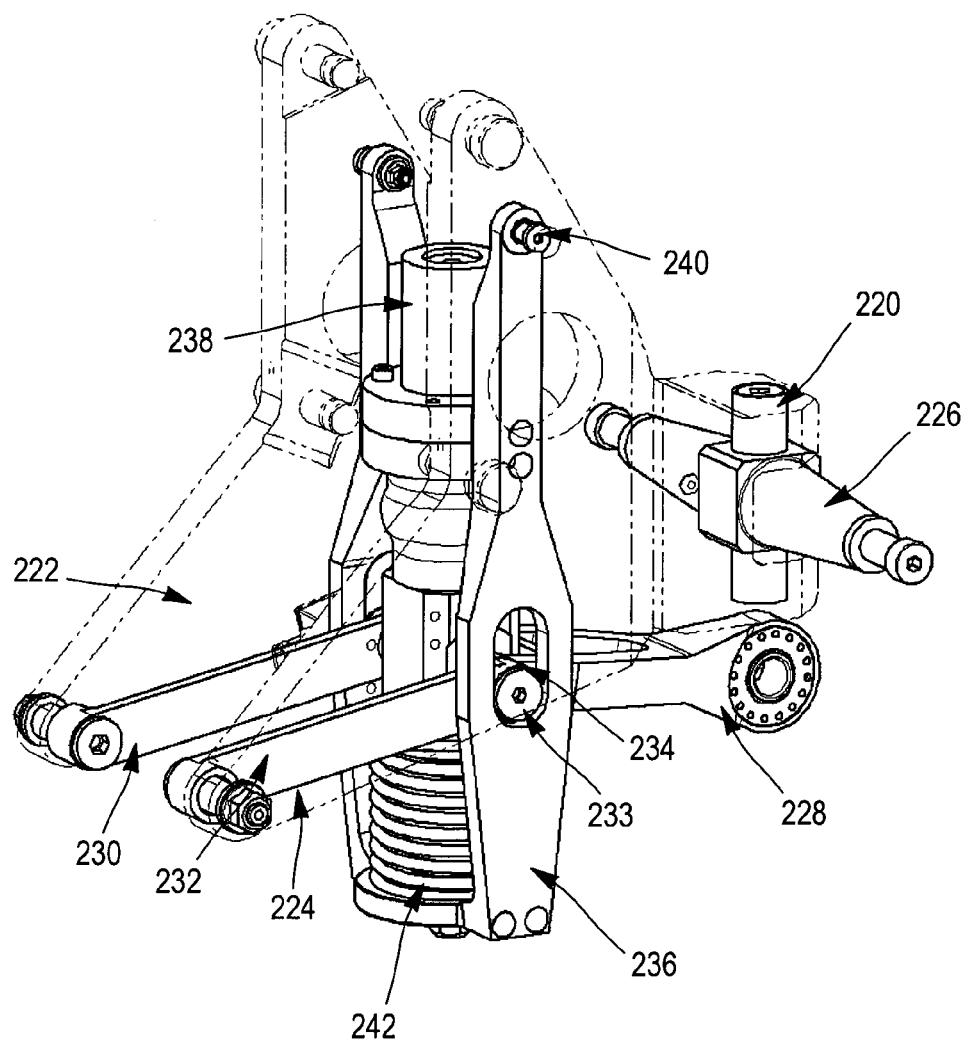
FIG. 13 is a perspective view of the clutch device of the assembly of the two systems.

In addition, in FIG. 13, in order to allow a certain degree of freedom for relative horizontal movement of the reduction gears in the event of deformation of the landing gear, and thus ensure that the forces on each wheel are approximately equal, the reduction unit is mounted on the clutch via a substantially vertical pivot pin 220.

In this embodiment, as illustrated in FIG. 13, the clutch device 7 comprises two fixed plates 222, 224 fixed to the un-sprung part 3A of the suspension strut and forming two planes parallel to the wheels. These two plates at one of their ends carry the vertical pivot axis 220 to which a horizontal shaft 226 is fixed. The motor unit 4 is fixed so as to pivot on this horizontal shaft. The motor unit is moreover fixed to one end of a link 228 that defines the first limb of a toggle joint. Thus, the motor unit pivots about the horizontal shaft 226 under the action of the link 228.

This link 228 is shaped as a V the point of which corresponds to the end to which the motor unit is fixed by means of a ball joint. Fixed to its other ends are two other links 230, 232 the opposite ends of which are fixed, mounted so that they can rotate about a horizontal pivot axis, to one of the tops of the fixed plates 222, 224. The movements of the articulations between the links 228 and 230, 232 are rotary movements about a horizontal pivot axis and are limited in vertical movement by the sliding of the pivot pin 233 in a slot 234 in a vertical plate supporting the movement system 236, this pin 233 corresponding to the pivot axis of the toggle joint.

The movement system 236 comprises an actuating jack 238 connected to the pivot pin 233 of the toggle joint and to the un-sprung part of the suspension strut 3 via the plates 222, 224 by the hinge point 240.

The clutch device 7 (more specifically the movement system 236) allows sufficient force to be applied to the output gear 10 of the motor unit 4 to keep it in mesh with the ring gear 6.

In this example, in order to ensure that the motor unit 4 disengages as soon as the electrical power to the drive motor of the movement system 236 is cut, the movement system 236 comprises a return spring 242 which, in this instance, envelopes the actuating jack 238. Thus, the actuating jack 238 is used to drive the motor unit 4 into its meshing position and the spring 242 is used to drive it into its out-of-mesh position. The spring 242 also ensures that there is no meshing of the gear 10 with the gear wheel 6 during landing.

The movement system 236 is designed to apply to the motor unit 4 (to the gear 10) a force higher than a limiting value necessary in order for the motor unit 4 to remain in the engaged position (in order for the gear 10 and the ring gear to remain in mesh). This force may be constant or, on the other hand, set to a value tailored to the force necessary to allow the transmission of driving or braking torque.

This is also a system that is self-disengaging should one of the wheels or one of the motors lock up, irrespective of the direction in which the aeroplane is travelling, once the load generated by the toothsets is higher than that of the engagement system. Thus, disengagement is forced by a mechanical effect of the force of the toothsets on the motor unit when a limiting bearing force is reached. It may also be commanded following an alarm issued by some other element in the system such as the reaching of a given driving torque level for example.

Furthermore, in the second embodiment, the fact that the two output gears 10 of the motor units 104 are coaxial means that the system can be mounted on a more flexible articulation or even that flexibility can be introduced into the system itself, which means that the deformations encountered, for example those of the wheels 2, can be accommodated for, the loads generated on the two ring gears 6 of the two wheels 2 being comparable. However, the loads may differ appreciably if the coefficients of grip encountered on the ground by each wheel of the landing gear are different.

In the present application to an aeroplane, this motorizing system is used for example during the phases prior to take-off and after landing, i.e. for any movement along the ground as long as the speed is below the maximum authorized taxiing speed. During these phases, it is therefore possible not to use the aeroplane main engines, thus economizing on fuel consumption and therefore saving on costs and on the emissions of pollutants and $CO_2$. Another consequence of switching off the aircraft main engines is that noise pollution can be lowered.

This motorizing system is electronically controlled so that the motor unit is in the disengaged position during the phases of landing and take-off, and during flight.

The present invention is not restricted to the present embodiment.

Thus, it could be used for motorizing a nosewheel.

Moreover, the strut could carry a different number of wheels, notably depending on the size of the aeroplane (from one wheel to eight). There could also be several systems per wheel (one wheel driven by several motors). It might also be possible for certain wheels (or just one wheel) to be motorized.

The invention claimed is:

1. Motorizing system for powering a wheel associated with a suspension of an aircraft so that the aircraft can be moved around on ground, the motorized system comprising:
   a motor unit;
   a drive member secured to the wheel; and
   a clutch device connecting an output shaft of the motor unit to the drive member,
   wherein the motor unit includes an electric motor and is movably carried by an unsprung part of a suspension strut, such that the motor unit is selectively movable relative to the drive member, and
   wherein a positive transmission occurs between the output shaft and the drive member.

2. Motorizing system for powering a wheel according to claim 1, wherein the motor unit is carried by an axle crossmember of the wheel.

3. Motorizing system according to one of claims 1 and 2, wherein the motor unit comprises a reduction system connecting the output shaft of the motor to the drive member.

4. Motorizing system according to claim 3, wherein the reduction system is secured to the electric motor.

5. Motorizing system according to claim 1, wherein the clutch device is configured in such a way as to be able to move the motor unit into an engaged position in which the motor unit is connected to the drive member, and a disengaged position in which the motor unit is separated from the drive member.

6. Motorizing system according to claim 5, wherein the clutch device is configured in such a way that the motor unit is mounted to pivot about a horizontal pivot axis with respect to an axle crossmember of the wheel.

7. Motorizing system according to claim 5 or 6, wherien the clutch device is configured in such a way that the motor unit is mounted to pivot about a substantially vertical pivot axis with respect to an axle crossmember of the wheel.

8. Motorizing system according to claim 1, wherein the clutch device comprises a movement system that enables the motor unit to be moved to and from an engaged position and a disengaged position.

9. Motorizing system according to claim 8, wherein the movement system is designed to apply to the motor unit a force higher than a limit value necessary for the motor unit to remain in the engaged position.

10. Motorizing system according to claim 8 or 9, wherein the movement system is designed to disengage the motor unit by application of a mechanical force higher than a predetermined value applied to the output shaft of the motor unit by the drive member.

11. Motorizing system according to claim 8 or 9, wherein the movement system comprises a driving element.

12. Motorizing system according to claim 11, wherein the driving element is formed of an actuating jack.

13. Motorizing system according to claim 12, wherein one end of the actuating jack is mounted for rotation on a fixing piece secured to an axle crossmember of the wheel, and another end of the actuating jack is mounted for rotation on two links, a first one of the two links being mounted for rotation on the fixing piece, and a second one of the two links being mounted for rotation on the motor unit.

14. Motorizing system according to claim 11, wherein the motor unit is arranged in such a way as to be naturally driven into the disengaged position under its own weight.

15. Motorizing system according to claim 1, wherein the clutch device comprises a guided link defining a disengaged position of the motor unit.

16. Motorizing system according to claim 15, wherein the guided link comprises a rod, the rod being mounted for rotation on a fixing piece secured to an axle crossmember of the wheel, and the rod being mounted for sliding with respect to a pivot carried by the motor unit.

17. Motorizing system according to claim 16, wherein a shock-absorbing unit, which is able to absorb shocks of the motor unit, is arranged between the pivot and a free end of the rod.

18. Motorizing system according to claim 17, wherein the shock-absorbing unit includes a fixed end stop fixed to the free end of the rod, a moving end stop mounted to slide along the rod between the free end of the rod and the pivot, and an elastic member arranged between the fixed end stop and the moving end stop in such a way that the elastic member is preloaded between the fixed end stop and the moving end stop when the motor unit is not in the disengaged position.

19. Motorizing system according to claim 1, wherein the drive member is an ring gear carried by a rim of the wheel and designed to enter into a meshed position with an output gear of the motor unit when the motor unit is in an engaged position.

20. Motorizing system according to claim 19, wherein the meshed position of the output gear is defined by two rolling lips carried by the ring gear and designed to have, rolling along the rolling lips without sliding, two runway tracks carried by the output gear.

21. Motorizing system according to claim 20, wherein the rolling lips and the runway tracks have a cylindrical bearing surface.

22. Motorizing system according to any one of claims 19 to 21, wherein the output gear is connected to the motor unit by a constant-velocity joint operating under a radial load.

23. Motorizing system according to claim 1,
wherein the motorizing system is one of two motorizing systems of an assembly,
wherein the wheel is one of two wheels associated with the assembly,
wherein the assembly includes the motor unit and a second motor unit, the two motor units are of the assembly being secured to one another and being fixed to the unsprung part of the suspension strut, and
wherein the suspension strut is common to the two wheels.

24. Motorizing system according to claim 23, wherein the two motor units are arranged between the two wheels.

25. Motorizing system according to claim 24, wherein the two motor units are arranged behind the suspension strut, which carries an axle crossmember of the two wheels.

26. Motorizing system according to claim 23, wherein each motorizing system of the assembly includes a shock-absorbing unit, which is able to absorb shocks of the motor unit, the shock-absorbing unit being arranged between a pivot carried by the motor unit and a free end of a rod of a guided link of the clutch device, the clutch device being configured in such a way that the motor unit is mounted to pivot about a horizontal pivot axis with respect to an axle crossmember of the wheel.

27. Motorizing system according to claim 23,
wherein the assembly includes the output gear and the drive member, which mesh with each other at substantially a same height as that of an axis of the two wheels, and
wherein the assembly includes a second output gear and a second drive member, which mesh with each other at substantially the same height as that of the axis of the two wheels.

* * * * *